Jan. 13, 1953   R. G. MUNSON ET AL   2,624,934
METHOD OF AND APPARATUS FOR HEAT TREATMENT
OF FILAMENTARY MATERIAL
Filed April 23, 1948   2 SHEETS—SHEET 1
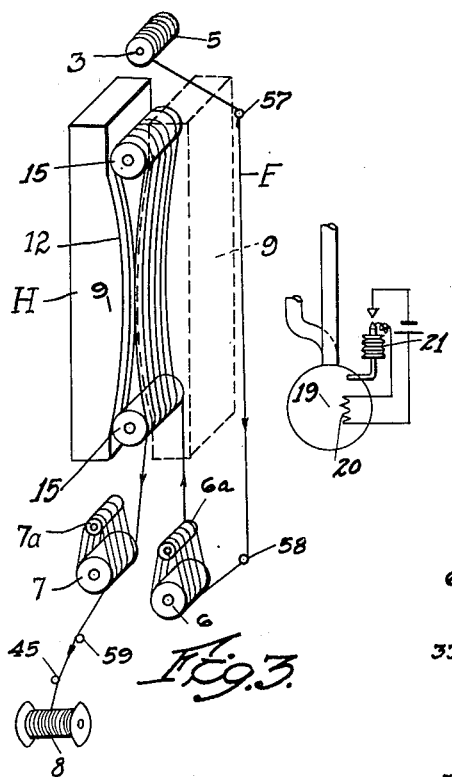
Fig.3.
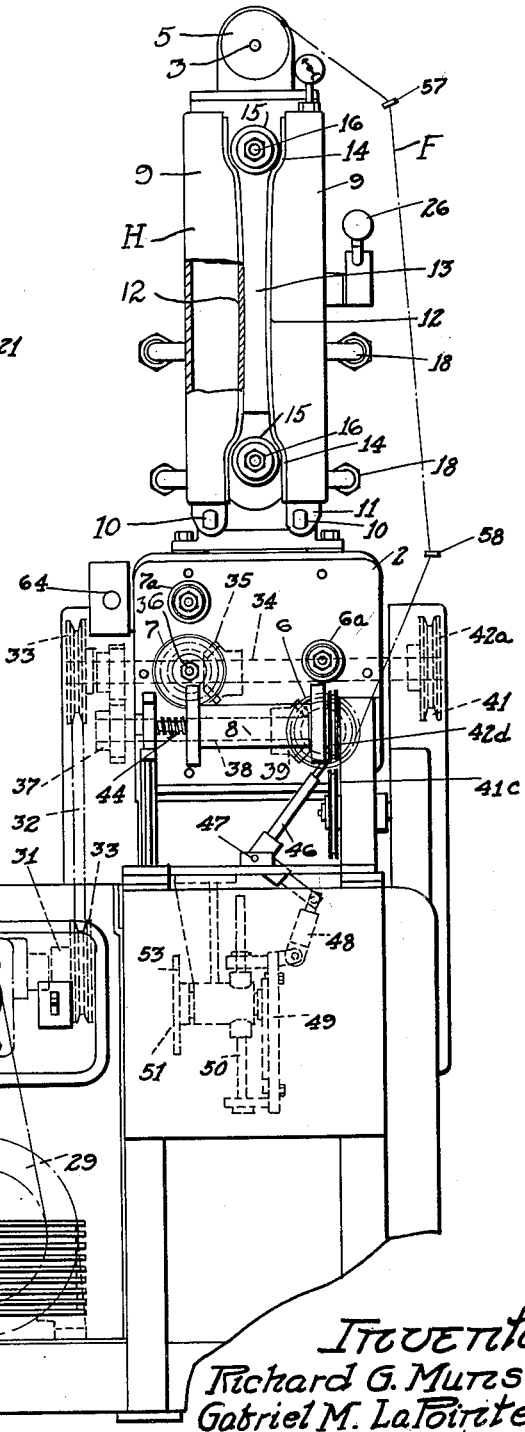
Fig.6.
Fig.1.
Inventors
Richard G. Munson
Gabriel M. LaPointe
BY Owen W. Kennedy
Attorney

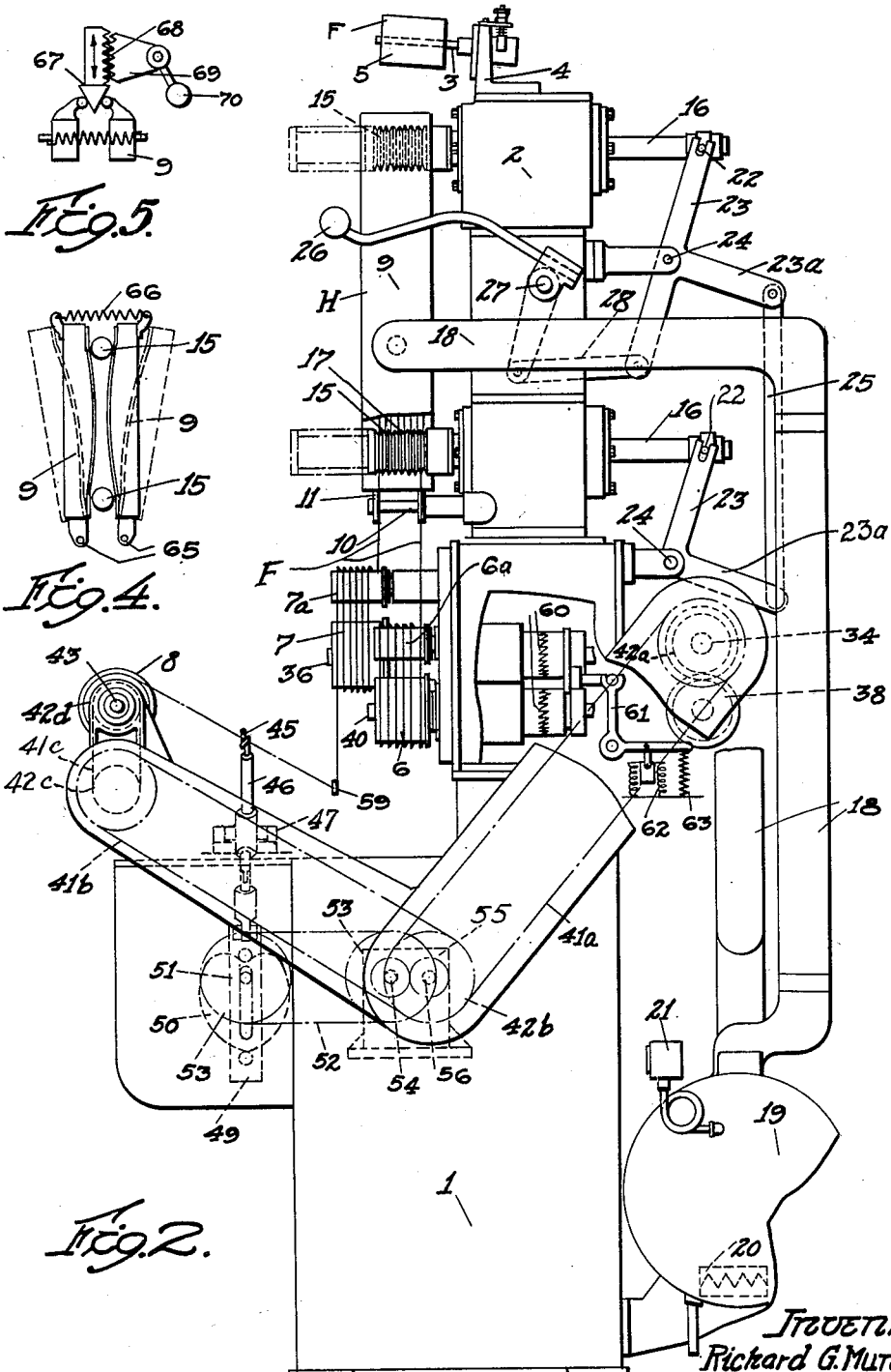

Patented Jan. 13, 1953

2,624,934

UNITED STATES PATENT OFFICE 2,624,934

METHOD OF AND APPARATUS FOR HEAT TREATMENT OF FILAMENTARY MATERIAL

Richard G. Munson and Gabriel M. La Pointe, Worcester, Mass., assignors to W. M. Steele Company, Incorporated, Worcester, Mass., a corporation of Massachusetts Application April 23, 1948, Serial No. 22,936

6 Claims. (Cl. 28—71.3)

1

The present invention relates to the heat treatment of filamentary material, such as various kinds of yarns, threads and cords composed of natural fibers, or composed of filament-forming material, such as the various cellulose derivatives or synthetic linear polymers of the thermo-extensible type, known by various trade names, as, for example, nylon.

It is an established fact in the field of textiles that the physical properties of filamentary materials are improved by subjecting such materials to various conditioning operations, many of which involve heating and stretching of the material, either as a combined operation, or separately, as may be desired, and the present invention relates generally to such conditioning processes.

The particular object of the present invention is to provide an improved method of and apparatus for the heat treatment of filamentary material, wherein a considerable length of material is subjected to a uniform heating effect while moving continuously between a supply of material and means for storing the treated material, as by a winding operation. In its passage between the material supply and storage means, the material moves in intimate surface contact with the elements of a heating unit, so constructed as to act upon a considerable length of material as it passes through the heating unit in a multiplicity of parallel paths. As a result, a maximum amount of material is subjected to a uniform heat treatment as it passes through the apparatus, thereby assuring a high rate of production with uniformity of output. Furthermore, the apparatus of the present invention is so constructed as to cause the filamentary material to be drawn through the heating unit under tension, so as to thereby obtain any desired degree of elongation of the material coincident with the heating thereof, or to cause passage of the material through the heating unit, without substantial elongation, as when utilizing the apparatus as a drier.

The above and other advantageous features of the invention will hereinafter more fully appear from the following description when considered in connection with the accompanying drawings, in which:

Fig. 1 is a view in front elevation of a machine embodying the present invention.

Fig. 2 is a view in side elevation of the machine shown in Fig. 1.

Fig. 3 is a diagrammatic view illustrating the travel of filamentary material through the machine.

2

Figs. 4 and 5 are fragmentary views illustrating a modification in the construction of the heating unit.

Fig. 6 illustrates a further modification in the form of the heating unit.

Referring to the drawings, the machine consists of a base 1 on which is mounted a vertically extending frame 2, at the top of which a supply spindle 3 is rotatably mounted in a bracket 4. A package 5 of filamentary material F is shown as being supported by the spindle 3, with the filamentary material F being in the form of yarn, thread, or cord which it is desired to subject to a heat treatment. In order to illustrate the utility of the invention, it will be considered that the filamentary material F is in the form of a cord composed of a synthetic linear polymer, such as nylon, which possesses thermo-extensible qualities, and that it is desired to subject this yarn to high temperature, while under considerable tension, to stretch the cord and increase its tensile strength.

For this purpose, the machine generally comprises heating unit H mounted at the front of the frame 2, the details of which will be later described, and two sets of rotatably driven feed rolls 6 and 7 mounted on the frame below the heating unit H. As will later appear, the function of the rolls 6 and 7 is to withdraw the filamentary material F from the package 5 and pass it through the heating unit H, while subjecting it to the desired amount of tension, after which the conditioned material is wound on a take-up spool 8 mounted on a forwardly projecting portion of the base 1 in front of the rolls 6 and 7.

As best shown in Figs. 1 and 3, the heating unit H comprises a pair of elongated tanks 9, 9 supported in spaced relation in front of the frame 2 by means of studs 10 extending forwardly from the frame 2 and cooperating with feet 11 at the lower ends of the tanks 9. The tanks 9 are of generally rectangular form, with the inner wall 12 of each tank 9 having a curvature drawn about a large radius, so that the tank walls 12 define between them a space 13 that is narrowest at the middle of the heating unit, and is of gradually increasing width towards the ends of the space 13.

The oppositely facing convex tank walls 12 are reversely curved beyond the ends of the space 13 to provide concave portions 14 that partially encircle the outside peripheries of a pair of grooved rolls 15, 15 mounted for free rotation on parallel shafts 16 that are supported by the frame 2. It is to be noted that the concave surfaces 14 of the tanks 9 are concentric about the roll shafts 16, and that the ends of the space 13 are of less width than the diameters of the rolls 15.

As best shown in Fig. 2, each roll 15 is provided with a series of grooves 17, with the grooves 17 of the two rolls 15 being in vertical alignment, so that filamentary material F may be wound back and forth between the rolls 15 The depth of the grooves 17 is such that with the rolls 15 located between the tanks 9, the various lengths of filamentary material F extending between the rolls 15 will be bowed inwardly towards each other in the space 13 between the tanks 9, and will always be in intimate surface contact with the tank walls 12, as the material travels through the heating unit H in response to the pull developed by turning of the rolls 6 and 7 at different surface speeds, as will later appear.

The tanks 9 are adapted to be supplied with a suitable heating medium, so as to maintain their walls 12 at a substantially uniform temperature as the filamentary material F travels in contact with these walls. One way of providing such heat is by means of conduits 18 extending between a reservoir 19 and the outer sides of the tanks 9, with the reservoir 19 containing a fluid that assumes a gaseous form when its temperature is raised by means of a suitable electrical heating element 20 immersed in the fluid within the reservoir 19. Since the gas given off by the heating fluid within the reservoir 19 is in a closed circuit including the tanks 9, the pressure of the gaseous medium within the system will depend upon the temperature, and this pressure, in turn, provides a means for automatically controlling the temperature at which the tanks 9 are maintained.

To this end, a pressure regulator 21 is mounted on the reservoir 19, the function of which regulator is to automatically control the connection and disconnection of the heating element 20 to and from a source to electrical energy in accordance with its setting for a predetermined pressure. For example, with the regulator 21 set for a pressure not to exceed twenty pounds per square inch, the amount of heat supplied to the liquid in the reservoir 19 by the element 20 will be such as to maintain a temperature of around 415 degrees F. in the heating tanks 9.

In order to permit the filamentary material F to be readily wound back and forth between the rolls 15 within the grooves 17, the shafts 16 carrying the rolls 15 are longitudinally movable within the frame 2 between the full line and dotted line positions indicated in the broken-away portion of Fig. 2. In order to move the rolls 15 in unison from one position to the other, the inner ends of the shafts 16 are connected by pins 22 to levers 23 pivoted at 24. Parallel arms 23a of the levers 23 are connected by a link 25, so that the levers 23 will be moved in unison in response to the turning of a handle 26 pivoted at 27 and connected by a link 28 to the upper lever 23. By turning the handle 26 downwardly from the position of Fig. 2, both shafts 16 will be moved outwardly, with respect to the frame 2, and thereby shift both rolls 15 to the dotted line position, wherein the grooves 17 are disposed entirely outside of the tanks 9 in position for conveniently winding thereon the filamentary material F that is to be heat treated.

As previously pointed out, the rolls 6 and 7 are adapted to be rotatably driven so as to draw the filamentary material F from the package 5 through the heating unit H and to deliver it to the storage spool 8 with the stretch removed therefrom, if desired. Power for driving the rolls 6 and 7 is obtained from a motor 29 located in the base 1, with the motor 29 being connected to a variable speed fluid transmission 30 of any desired type, the output shaft of which is indicated at 31. The shaft 31 is connected by a belt 32 and pulleys 33 to a shaft 34 connected by bevel gearing 35 to a shaft 36 on which the roll 7 is mounted.

Shaft 34 is connected by gearing 37 to a countershaft 38 that is connected by bevel gearing 39 to a shaft 40 on which the roll 6 is mounted. Consequently, the rolls 6 and 7 are driven in unison from the power transmission 30, with the speeds of the roll shafts 36 and 40 being the same, assuming a one to one ratio for the gearing 37 which connects shafts 34 and 38. Generally speaking, it is necessary that the roll 7 have a slightly greater surface speed than roll 6 in order to develop a pull on the filamentary material F sufficient to draw it through the heating unit H, for which purpose the roll 7 is of slightly greater diameter than the roll 6. However, when it is desired to also stretch the material, coincidentally with heating the same, as when handling a material such as nylon, a roll 7 of even greater diameter is employed to obtain the desired amount of stretch.

The take-up spool 8 is adapted to be driven from the roll operating shaft 34 through a series of belts 41a, 41b and 41c cooperating with pulleys 42a, 42b, 42c and 42d as shown in Fig. 2, with the final drive being to a shaft 43 on which the spool 8 is freely mounted. A spring 44 surrounding shaft 43, see Fig. 1, tends to press one end of the spool 8 against the pulley 42d, so that the spool 8 is driven frictionally as the shaft 43 rotates to wind the filamentary material F on the spool 8 without appreciable tension.

In order that the material will be evenly wound on the spool 8, the material passes through a guide 45 at the free end of a laying arm 46 pivoted at 47, see Fig. 1. The arm 46 is connected by linkage 48 to a slide 49 to which an up and down reciprocatory movement is imparted by means of a cam 50 mounted on a shaft 51. The shaft 51 is driven by a chain 52 and sprockets 53 from a shaft 54 connected by a speed reducer, indicated at 55, to the shaft 56 on which the pulley 42b is mounted.

When it is desired to set up the machine for operation, the filamentary material F is led downwardly from the package 5 through guides 57 and 58 and then wrapped several times around the driven roll 6 and an associated spacer roll 6a that is mounted above the roll 6 with its axis at a slight angle to the lower roll which is of larger diameter. The material is then led upwardly to the grooves 17 in the rolls 15 that have been previously moved out from between the heating tanks 9 by moving the lever 26 downwardly. The material is then passed back and forth in the grooves 17 between the rolls 15 until all of the grooves have been filled, after which the material is led downwardly to the driven roll 7 and wrapped several times around this roll and its cooperating spacer roll 7a. The material is then led from the roll 7 around a fixed guide 59 through the laying guide 45 from which it is wound on the take-up spool 8.

The above described disposition of the filamentary material F in the machine is shown diagrammatically in Fig. 3, from which it is apparent that when the rolls 6 and 7 are rotatably driven, the material will be drawn from the package 5 and, after leaving the rolls 6 and 6a, will move in substantially continuous engagement with the heated walls 12 of the tanks 9. As the material progresses through the grooves 17 of the rolls 15, it will be subjected to a uniform heating action, and by reason of the large number of grooves 17, it is apparent that at any one instant, a considerable length of material will be under heat treatment. Furthermore, any given length of material will be exposed to such uniform heat treatment for a considerable length of time.

For example, with the roll shafts 16 twenty-four inches apart, and with the rolls 15 each providing fifteen grooves 17, there will be approximately 50 feet of material under heat treatment while the machine is in operation. Consequently, the machine can be operated so as to produce heat treated material and wind it on the take-up spool 8 at a high rate of production determined by the length of time it is desired to expose a given length of material to the heating action. Thus, a delivery rate of 10 feet per second will insure that any given length of material will be exposed to heating for approximately 5 seconds, for the figures given above. The fact that the heating tanks 9 extend vertically enables the machine to be mounted within a relatively small floor space, with the height of the machine being such that all parts traversed by the material to be heat treated are readily accessible to the machine operator.

As previously pointed out, the roll 7 has a surface speed somewhat greater than the surface speed of the roll 6, so that the difference in these speeds determines the draft applied to the material as it is drawn through the heating unit H. When it is desired to stretch the material simultaneously with the heat treatment thereof, the surface speed of the roll 7 is increased by use of a larger diameter roll and obviously, the amount of stretching resulting from a given draft will depend upon the physical characteristics of the material. For example, when handling synthetic material of the thermo-extensible type, such as a nylon cord of 2000 denier, having 30 per cent elongation at its breaking point, the diameter of the roll 7 will be made enough greater than the diameter of the roll 6 to cause a 20 per cent elongation of the cord in passing through the heater H. It has been found that nylon cord, when passed through the machine under the conditions noted above, will have substantially 50 per cent of its stretch removed, with a resulting increase of tensile strength.

By reducing the surface speed of the roll 7, with relation to the roll 6, the amount of draft on the material can be reduced to the point where it will be just sufficient to draw the material through the heating unit, without any appreciable elongation. This mode of operation of the machine is employed under conditions wherein it is desired to dry material that has been previously moistened, as a result of subjecting the material to a liquid treating bath, such as is used for sizing, waterproofing, or otherwise conditioning filamentary material in the form of thread or cord.

In the operation of the machine, as either a stretcher or drier, uniform heat treatment is always obtainable, through intimate engagement of multiple lengths of the material with the curved walls 12 of the heating tanks 9. By reason of the relatively large areas presented by the tank walls 12, it is possible to maintain an extremely uniform degree of heating, without concentrating the heat at any one point such as would tend to burn the material. As previously pointed out, the exact temperature of the heating unit H can be automatically controlled as by means of the pressure regulator 21, which is shown in Fig. 3 as being adapted to control the connection of the heating element 20 in the reservoir 19 containing the heating medium. Obviously, a thermostat can be employed in substantially the same manner to automatically control the temperature of the heating unit.

While the machine is in operation to draw filamentary material F through the heating unit H, the two sets of rolls 6, 6a and 7, 7a function to maintain an even draft on the material without substantial slippage, due to the fact that the material is wrapped several times around each pair of rolls. Furthermore, each spaced roll 6a or 7a is set at a slight angle to its cooperating draft roll 6 or 7, so as to cause the material wrapped around the rolls to travel axially of the rolls as it passes to and from the heating unit.

The arrangement whereby the rolls 15 can be moved forwardly to a point outside the heating unit H, as indicated in dotted lines in Fig. 2, permits the machine to be readily set up for operation, after which the rolls 15 are returned to the full line position. In order to expedite the preparation of the machine for operation, the shafts 36 and 40 carrying the draft rolls 6 and 7 are provided with clutches 60 shown in the broken away portion of Fig. 2. With the clutches 60 disengaged, it is possible to freely turn the rolls 6 and 7 by hand, so as to expedite the passage of the material through the machine, preparatory to operating the same under power.

In order to free the draft rolls 6 and 7, a common actuator 61 is employed for operating the clutches 60, which actuator 61 is under the control of an electromagnet 62. With the electromagnet 62 in a deenergized condition, a spring 63 normally urging actuator 61 to the left, as viewed in Fig. 2, tends to maintain the clutches 60 in engagement, and the clutches will remain so engaged until thrown out by the actuator 61 upon energization of the electromagnet 62 through closure of the push button switch 64, which is readily accessible from the front of the machine, as shown in Fig. 1, near the draft rolls 6 and 7. By operating the switch 64 to throw out the clutches, as desired, it is possible to turn the draft rolls by hand, as when setting up the machine for operation.

As previously pointed out, operation of the handle 26 is adapted to move the grooved rolls 15 either in or out, with respect to the heater tanks 9, and Fig. 4 illustrates an arrangement whereby the tanks 9 may be moved with respect to the rolls 15. In this modified arrangement, each tank 9 is supported at its lower end on a pivot 65, with a spring 66 tending to yieldingly hold the tanks together in the full line position. As shown in Fig. 5, a top plan view, a wedge bar 67 is adapted to separate the tanks when moved by a rack 68 and gear 69 under control of a handle 70. With the tanks 9 in the dotted line position of Fig. 4, as a result of turning the handle 70, the material on the rolls 15 is accessible for inspection, or adjustment, without removing it from the machine. Furthermore, the pivotal mounting of the tanks 9 permits the heated walls 12 thereof to be quickly moved out of engagement with the material to prevent overheating thereof, should it become necessary to suddenly shut down the machine.

Fig. 6 shows a further modification in the construction of the heating unit H, wherein a third tank 9a is mounted in the space 13 between the outside tank 9. The outer walls 12a of the inner tank 9a are concave and extend in parallel spaced relation, with respect to the convex walls 12 of the outer tanks 9. The inner tank 9a terminates just short of the grooved rolls 15, so that the filamentary material F is closely confined between the heated surfaces of the walls 12 and 12a. As a result, the material is heated from opposite sides, as it passes back and forth between the rolls 15, with the material being confined during substantially all of its travel through the heating unit H.

From the foregoing, it is apparent that by the present invention, there is provided an improved method of and apparatus for the heat treatment of filamentary material, whereby a large number of separate courses of a given length of the material are subjected to a uniform heating effect, while moving continuously between a supply of material, such as the yarn package 5, and means for storing the material, such as the take-up spool 8. As a result, a maximum amount of the material is subjected to a uniform heat treatment as it passes through the apparatus, which is adapted to function so as to either draw the material through the heating unit under tension, so as to stretch the same coincidentally with the heating, or to merely cause passage of the material through the heating unit, without substantial elongation, as when utilizing the apparatus as a drier.

We claim:

1. Apparatus for heat treatment of filamentary material comprising a pair of heating elements providing oppositely facing convex surfaces having a space therebetween, a third heating element located in said space and means disposed at the ends of said elements for conducting filamentary material back and forth in a plurality of paths in running engagement with the heated surfaces of all of said elements.

2. Apparatus for heat treatment of filamentary material comprising a pair of heating elements providing oppositely facing convex surfaces having a space therebetween and a pair of grooved rolls disposed at the ends of said elements, and substantially closing the space therebetween for conducting filamentary material back and forth in a plurality of oppositely disposed curved paths in running engagement alternately with said heated surfaces, with the curvature of said surfaces being such as to deflect the material as it passes on to or off said rolls, and so cause its close engagement with the heated surfaces of said elements.

3. Apparatus for heat treatment of filamentary material comprising a pair of heating elements providing oppositely facing convex surfaces having a space therebetween, a pair of grooved rolls disposed at the ends of said elements for conducting filamentary material back and forth in a plurality of paths in running engagement alternately with said heated surfaces, and means for moving said rolls with the material thereon with respect to said heating elements to bring the material into or out of engagement with said heated surfaces.

4. Apparatus for heat treatment of filamentary material comprising a pair of heating elements providing oppositely facing convex surfaces having a space therebetween, and a pair of grooved rolls disposed at the ends of said elements for conducting filamentary material back and forth in a plurality of paths in running engagement alternately with said heated surfaces, and means for bodily moving said elements with respect to said rolls for disengaging said heating surfaces from the filamentary material.

5. Apparatus for the heat treatment of filamentary material comprising a pair of heating elements providing oppositely facing convex surfaces having a space therebetween, a pair of grooved rolls disposed at the ends of the space between said heating elements for conducting filamentary material back and forth in a plurality of oppositely disposed curved paths in running engagement alternately with said heated surfaces, with the diameter of said rolls being greater than the distance between said surfaces at the narrowest point of said space, and means for exerting a draft on filamentary material passing around said rolls and in running engagement with said elements, with the curvature of said surfaces serving to deflect the material as it passes onto or off of said rolls and cause its close engagement therewith, accompanied by stretching of the material simultaneously with the heating thereof due to the draft imposed thereon.

6. An improvement in the treatment of filamentary material having thermo-extensible properties which consists in moving a continuous length of such material back and forth between surfaces of revolution, with which the material has rolling contact, while confining the material between stationary, heated surfaces of convex form, with which the material has running engagement, with said heated surfaces being maintained automatically at a predetermined temperature, and with said surfaces of revolution traveling at different speeds to cause elongation of the moving heated material.

RICHARD G. MUNSON.
GABRIEL M. LA POINTE.

REFERENCES CITED

The following references are of record in the file of this patent:

UNITED STATES PATENTS

| Number | Name | Date |
|---|---|---|
| 941,721 | Moss | Nov. 30, 1909 |
| 1,052,896 | Cutter | Feb. 11, 1913 |
| 1,165,819 | Ware | Dec. 28, 1915 |
| 1,974,453 | Gallaudet | Sept. 23, 1934 |
| 2,199,411 | Lewis | May 7, 1940 |
| 2,263,712 | Wrigley et al. | Nov. 25, 1941 |
| 2,440,159 | Stanley | Apr. 20, 1948 |
| 2,455,173 | Hitt | Nov. 30, 1948 |
| 2,464,502 | Hall et al. | Mar. 15, 1949 |
| 2,495,053 | Conaway et al. | Jan. 17, 1950 |
| 2,509,741 | Miles | May 30, 1950 |